United States Patent
Shimomura

(10) Patent No.: US 9,565,660 B2
(45) Date of Patent: Feb. 7, 2017

(54) INFORMATION PROCESSING APPARATUS, WIRELESS COMMUNICATION APPARATUS, AND INFORMATION PROCESSING METHOD

(71) Applicant: FUJITSU LIMITED, Kawasaki-shi, Kanagawa (JP)

(72) Inventor: Tsuyoshi Shimomura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 183 days.

(21) Appl. No.: 14/322,056

(22) Filed: Jul. 2, 2014

(65) Prior Publication Data

US 2014/0315590 A1 Oct. 23, 2014

Related U.S. Application Data

(63) Continuation of application No. PCT/JP2012/051424, filed on Jan. 24, 2012.

(51) Int. Cl.
*H04W 72/04* (2009.01)
*H04W 16/14* (2009.01)
(Continued)

(52) U.S. Cl.
CPC ........... *H04W 72/0406* (2013.01); *H04B 1/38* (2013.01); *H04W 16/14* (2013.01); *H04W 48/12* (2013.01)

(58) Field of Classification Search
CPC ..... H04B 17/309; H04B 17/23; H04L 5/0053; H04L 27/2656; H04W 16/14; H04W 24/10; H04W 48/08; H04W 24/00; H04W 28/20; H04W 72/0406; H04N 21/436; H04N 21/25841
See application file for complete search history.

(56) References Cited

U.S. PATENT DOCUMENTS

2007/0224988 A1 9/2007 Shaheen
2008/0101284 A1 5/2008 Buchwald et al.
(Continued)

FOREIGN PATENT DOCUMENTS

JP 2008-306665 12/2008
JP 2009-165117 7/2009
(Continued)

OTHER PUBLICATIONS

Seok et al, WO2011030960A1, machine translated.*
(Continued)

*Primary Examiner* — Ping Hsieh
*Assistant Examiner* — James Yang
(74) *Attorney, Agent, or Firm* — Fujitsu Patent Center

(57) ABSTRACT

An information processing apparatus that manages information of a first frequency band allocated to a first communication system includes: a reception unit that receives, from a second communication system different from the first communication system, capability information indicating sensing capability of sensing a wireless signal by a communication apparatus of the second communication system; and a transmission unit that transmits, to the communication apparatus of the second communication system, information related to a sensing method for sensing a wireless signal transmitted from a communication apparatus of the first communication system in a second frequency band included in the first frequency band, based on the information of the first frequency band and the capability information of the communication apparatus of the second communication system.

3 Claims, 13 Drawing Sheets

(51) Int. Cl.
*H04B 1/38* (2015.01)
*H04W 48/12* (2009.01)

(56) References Cited

U.S. PATENT DOCUMENTS

| | | | |
|---|---|---|---|
| 2009/0170545 A1 | 7/2009 | Choi et al. | |
| 2009/0303941 A1* | 12/2009 | Naka | H04L 5/023 |
| | | | 370/329 |
| 2011/0199965 A1 | 8/2011 | Ariyoshi et al. | |
| 2011/0286381 A1 | 11/2011 | Ye et al. | |
| 2012/0314088 A1* | 12/2012 | Li | H04N 5/50 |
| | | | 348/192 |
| 2013/0029705 A1 | 1/2013 | Chen et al. | |
| 2013/0064237 A1 | 3/2013 | Villardi et al. | |

FOREIGN PATENT DOCUMENTS

| | | |
|---|---|---|
| JP | 2009-531972 | 9/2009 |
| JP | 2009-246874 | 10/2009 |
| JP | 2010-178225 | 8/2010 |
| JP | 2011-193422 | 9/2011 |
| JP | 2011-259483 | 12/2011 |
| WO | 2009/084465 | 7/2009 |
| WO | 2011/015960 A1 | 2/2011 |
| WO | 2011/132760 | 10/2011 |
| WO | 2011/140899 A1 | 11/2011 |

OTHER PUBLICATIONS

Muraoka et al, Monitoring-Based Spectrum, May 2011.*
Wei Zhang et al., "Cooperative Communications for Cognitive Radio Networks", Proceedings of the IEEE, May 1, 2009, vol. 97, No. 5, pp. 878-893. IEEE New York, US.
EESR—The Extended European Search Report dated Nov. 17, 2015 issued in the corresponding European Patent Application No. 12866927.2.
Notification of Transmittal of Translation of the International Preliminary Report on Patentability (Form PCT/IB/338, Form PCT/IB/373 & Form PCT/ISA/237), PCT/JP2012/051424, 6 pages, dated Aug. 7, 2014.
Federal Communications Commission, FCC10-174, "Second Memorandum Opinion and Order", Sep. 23, 2010 (19 pages).
S. Haykin, "Cognitive Radio: Brain-Empowered Wireless Communications", IEEE Journal on Selected Areas in Communications, vol. 23, No. 2, Feb. 2005 (pp. 201-220).
International Search Report, mailed in connection with PCT/JP2012/051424 and mailed Feb. 21, 2012.

* cited by examiner

FIG. 4A

PRIMARY SYSTEM TABLE PER FREQUENCY BANDS

| FREQUENCY BANDS | SYSTEM 1 | SYSTEM 2 | SYSTEM 3 |
|---|---|---|---|
| fa-fb | 1001 (X TYPE, RADIO BROADCAST) | — | — |
| fb-fc | 2001 (Y TYPE, SENSOR) | — | — |
| fd-fe | 3001 (TV BROADCAST) | 3002 (RADIO MICROPHONE) | — |
| fe-ff | 4001 (Z TYPE) | — | — |
| ... | ... | ... | ... |

FIG. 4B

SENSING AUXILIARY INFORMATION DATABASE

| PRIMARY SYSTEM IDETIFICATION NUMBER | NEEDED SENSING SENSITIVITY [dBμV/m] | VALIDITY OF CYCLOSTATIONARY DETECTION | VALIDITY OF DIRECTIONAL SENSING | EXPIRATION PERIOD |
|---|---|---|---|---|
| 1001 | X2 | NO | YES | ta |
| 2001 | X1 | NO | NO | tb |
| 3001 | X0 | YES | YES | tc |
| 3002 | X3 | YES | NO | td |
| 4001 | X4 | YES | YES | te |
| ... | ... | ... | ... | |

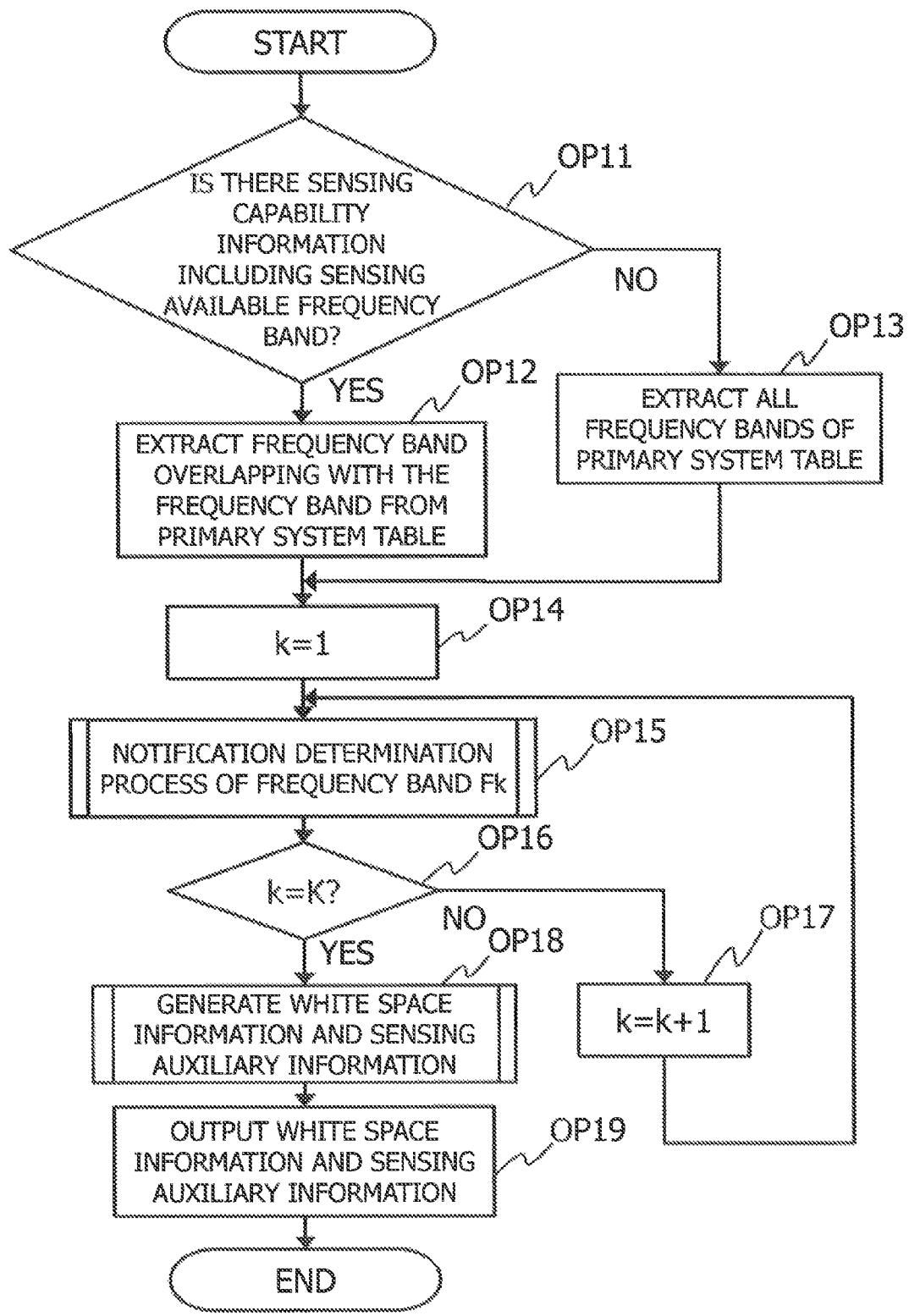

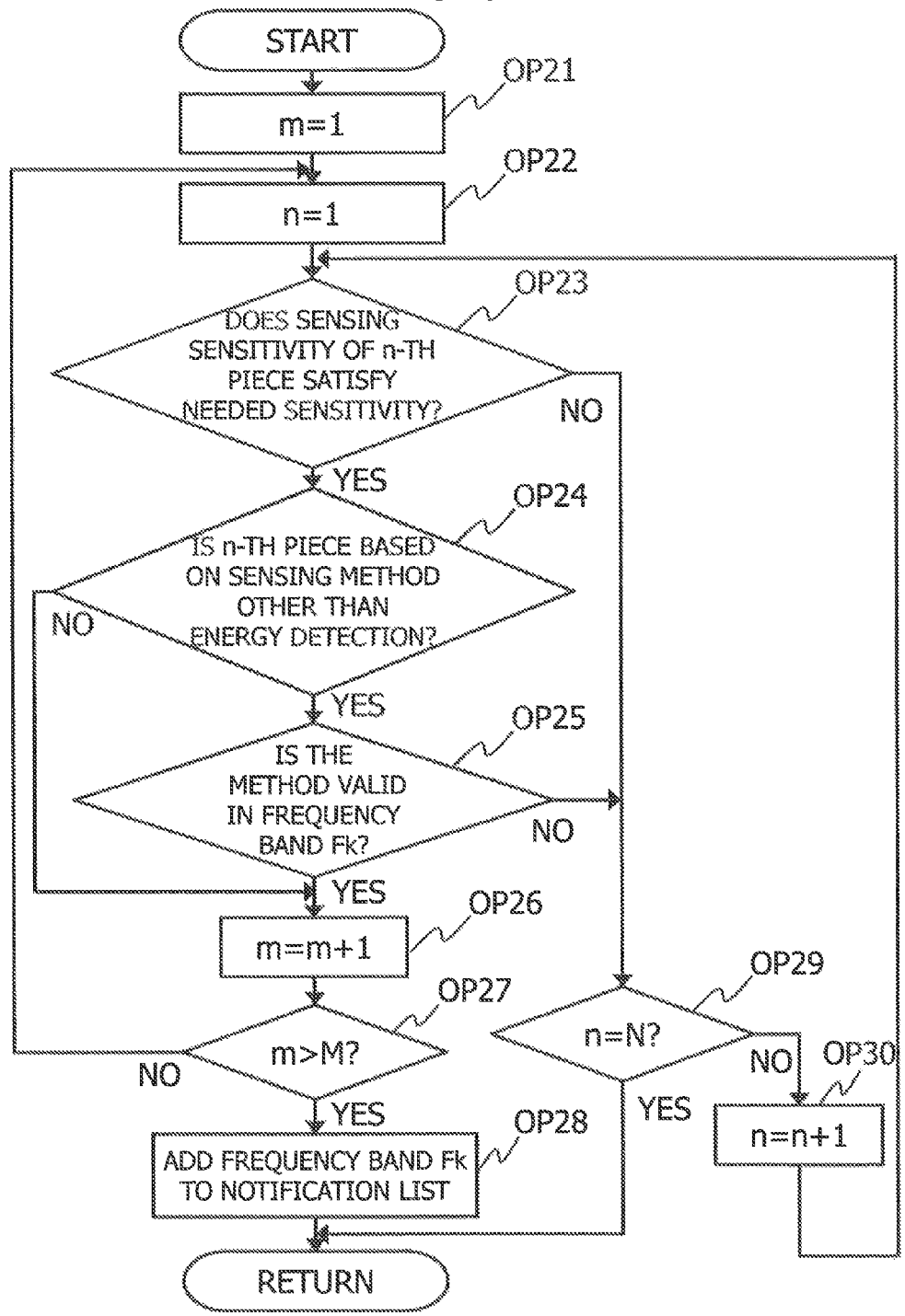

FIG. 9

PRIMARY SYSTEM TABLE PER FREQUENCY BANDS IN SPECIFIC EXAMPLE
(SECONDARY USE UNAVAILABLE BANDS: 710MHz-920MHz, 950MHz-960MHz)

| | FREQUENCY BANDS | SYSTEM 1 | SYSTEM 2 | SYSTEM 3 |
|---|---|---|---|---|
| F1 | 470MHz-710MHz | 1001 (TV BROADCAST) | — | — |
| F2 | 920MHz-950MHz | 2001 (PRIVATE WIRELESS) | — | — |
| F3 | 960MHz-1.2GHz | 3001 (RADAR) | — | — |

FIG. 10

SENSING AUXILIARY INFORMATION DATABASE IN SPECIFIC EXAMPLE

| PRIMARY SYSTEM | NEEDED SENSING SENSITIVITY [dBμV/m] (PER 1MHz) | VALIDITY OF CYCLOSTATIONARY DETECTION | VALIDITY OF DIRECTIONAL SENSING | EXPIRATION PERIOD |
|---|---|---|---|---|
| 1001 | +50 | YES | YES | ta |
| 2001 | +60 | YES | NO | tb |
| 3001 | +35 | NO | YES | tc |

FIG. 11

| SENSING CAPABILITY INFORMATION IN SPECIFIC EXAMPLE | | |
|---|---|---|
| n=1 | SENSING AVAILABLE FREQUENCY | 600MHz-1GHz |
| n=2 | ENERGY DETECTION WITHOUT DIRECTIONALITY (PER 1 MHz) | +60dBμV/m |
| n=3 | ENERGY DETECTION WITH DIRECTIONALITY (PER 1 MHz) | +52dBμV/m |
| n=4 | CYCLOSTATIONARY DETECTION WITHOUT DIRECTIONALITY (PER 1 MHz) | +40dBμV/m |
| n=5 | CYCLOSTATIONARY DETECTION WITH DIRECTIONALITY (PER 1 MHz) | +34dBμV/m |

INFORMATION PROCESSING APPARATUS, WIRELESS COMMUNICATION APPARATUS, AND INFORMATION PROCESSING METHOD

CROSS-REFERENCE TO RELATED APPLICATION

This application is a continuation application of International Application PCT/JP2012/051424, filed on Jan. 24, 2012, and designated the U.S., the entire contents of which are incorporated herein by reference.

FIELD

The present invention relates to a wireless communication apparatus and to an information processing apparatus and an information processing method related to management of wireless communication.

BACKGROUND

In recent years, wireless traffic is continuously increasing, and demand for frequencies is continuously increasing. An example of means for effectively using finite frequencies includes a cognitive radio technique. The cognitive radio technique is a technique of performing communication by recognizing a surrounding radio wave environment and by appropriately changing the frequency and mode. An example of the cognitive radio technique includes a white space cognitive radio technique of performing communication by finding a white space (White Space: WS), which is an unused band in frequency bands, according to time and place, without interfering wireless signals from systems that preferentially use each of the frequency bands. For example, rules related to the use of communication of TV white space (Television White Space: TVWS) are released in September, 2010 in the U.S.A.

In the white space cognitive radio technique, a system that has priority to use a frequency is called a primary system or a first system. A system that finds and uses a white space of the frequency band allocated to the primary system is called a secondary system or a second system. Examples of a method of finding the white space include a sensing mode and a database access mode.

In the sensing mode, a communication apparatus of the secondary system uses a sensing device to physically sense the white space. Examples of a sensing method of a wireless signal by the communication apparatus of the secondary system include energy detection, cyclostationary detection, matched filter, eigenvalue analysis, and the like. A frequency band in which the detection result in these methods is equal to or smaller than a reference threshold is determined as a white space.

In the database access mode, the communication apparatus of the secondary system accesses a database on a network to acquire information of the white space. The database stores information of the white space calculated from information, such as location of a transmission station of the primary system, transmission power, and transmission frequency, in association with location information. For example, the communication apparatus of the secondary system that uses the database access mode accesses the database once or more a day to use the white space.

PATENT DOCUMENT

[Patent document 1] Japanese Patent Laid-Open No. 2010-178225

[Patent document 2] International Publication No. WO 2009/084465

[Patent document 3] Japanese Patent Laid-Open No. 2009-246874

[Patent document 4] Japanese Patent Laid-Open No. 2009-165117

NON-PATENT DOCUMENT

[Non-Patent document 1] FCC, "Second Memorandum Opinion and order" in ET Docket No. 04-186, Sep. 23, 2010

In the WS type cognitive radio technique of the database access mode, the white space is calculated by taking into account changes in radio wave propagation due to geography, weather, and the like by using a statistical model derived from the measurement result of the radio wave propagation. However, the calculation of the database is a simulation, and the calculation does not ensure that the frequency band computed as a white space is an unused band. Therefore, for example, there is a location that is not included in a service area of the primary system in the calculation of the database, but that actually receives a radio wave from the primary system. More specifically, depending on the location of the communication apparatus of the secondary system, even the frequency band of the white space obtained from the database may not be able to be used.

On the other hand, in the WS cognitive radio technique of the sensing mode, the communication apparatus of the secondary system detects the white space in real time at the location where the white space is to be used, and flexible response to the state of the ambient environment is possible.

However, in the WS type cognitive radio technique of the sensing mode and the database access mode, the communication apparatus of the secondary system does not recognize the sensing method suitable for the primary system. The sensing method suitable for the primary system is, for example, a sensing method that can more largely sense the field intensity (or reception power) of the wireless signal from the primary system. However, since the communication apparatus of the secondary system does not recognize the sensing method suitable for the primary system, the sensing may be performed by a sensing method different from the suitable sensing method. In this case, the reception state of the radio wave, such as parameters used for sensing and direction of antenna, is not suitable compared to when the sensing process is executed by the suitable sensing method, and the field intensity detected in the communication apparatus of the secondary system is a small value. Therefore, the communication apparatus of the secondary system may not be able to appropriately sense the wireless signal. Hereinafter, the field intensity (or reception power) that can be sensed by the communication apparatus will be called sensing sensitivity. Hereinafter, determination accuracy in sensing a wireless signal will be called sensing accuracy.

To improve the sensing sensitivity and accuracy in the communication apparatus of the secondary system, for example, higher-performance of the hardware is considered. However, there are various types of communication apparatuses of the secondary system, and provided hardware is also different. Therefore, it is difficult to define uniformly high performance hardware conditions to side of the secondary systems.

In the communication apparatus of the secondary system, the sensing accuracy can also be improved by increasing the time length (sensing time) of the reception signal to be processed. For example, even if a signal has not arrived from the primary system, the power of the reception signal of noise may be greater than normal power of the reception signal of noise. Therefore, if the sensing time is short, a reception signal of noise with power greater than usual is also sensed, and this increases the possibility that the signal is erroneously sensed as a wireless signal from the primary system. As a result, the accuracy of determination of whether the signal is from the primary system, that is, the sensing accuracy, is reduced. If the sensing time is long, for example, the influence of noise as described above can be reduced, and the sensing accuracy can be improved. However, the increase in the sensing time leads to calculation with longer accumulation of the reception signal as a processing target of sensing, and this leads to an increase in the dimension of the calculation circuit or an increase in the power consumption.

SUMMARY

An aspect of the present invention provides an information processing apparatus. The information processing apparatus is an information processing apparatus that manages information of a first frequency band allocated to a first communication system, the information processing apparatus including:

a reception unit that receives, from a second communication system different from the first communication system, capability information indicating sensing capability of sensing a wireless signal by a communication apparatus of the second communication system; and a transmission unit that transmits, to the communication apparatus of the second communication system, information related to a sensing method for sensing a wireless signal transmitted from a communication apparatus of the first communication system in a second frequency band included in the first frequency band, based on the information of the first frequency band and the capability information.

Another aspect of the present invention provides an information processing method executed by the information processing apparatus. Another aspect of the present invention provides a wireless communication apparatus of a second communication system different from a first communication system provided with a first frequency band. The wireless communication apparatus includes:

a transmission unit that transmits capability information indicating sensing capability of sensing a wireless signal transmitted from another wireless communication apparatus, to an information processing apparatus that manages information of the first frequency band;

a reception unit that receives information related to a sensing method for sensing a wireless signal transmitted from a communication apparatus of the first communication system in a second frequency band included in the first frequency band, the information transmitted from the information processing apparatus based on the information of the first frequency band and the capability information; and a processing unit that senses a wireless signal transmitted in the second frequency band from the first communication system based on the information related to the sensing method.

The object and advantages of the invention will be realized and attained by means of the elements and combinations particularly pointed out in the claims.

It is to be understood that both the foregoing general description and the following detailed description are exemplary and explanatory only and are not restrictive of the invention.

BRIEF DESCRIPTION OF DRAWINGS

FIG. 4A is an example of a primary system table.

FIG. 4B is an example of information stored in a sensing auxiliary information database;

FIG. 6A is an example of a flow chart of a process by an auxiliary information generation unit;

FIG. 6B is an example of a flow chart of a notification determination process of a frequency band Fk;

FIG. 9 is a primary system table of a management server in a specific example;

FIG. 10 is a sensing auxiliary information database of the management server in the specific example;

FIG. 11 is sensing capability information received by the management server in the specific example.

DESCRIPTION OF EMBODIMENTS

Hereinafter, an embodiment of the present invention will be described based on the drawings. A configuration of the following embodiment is illustrative, and the present invention is not limited to the configuration of the embodiment.

First Embodiment

Figure 1:
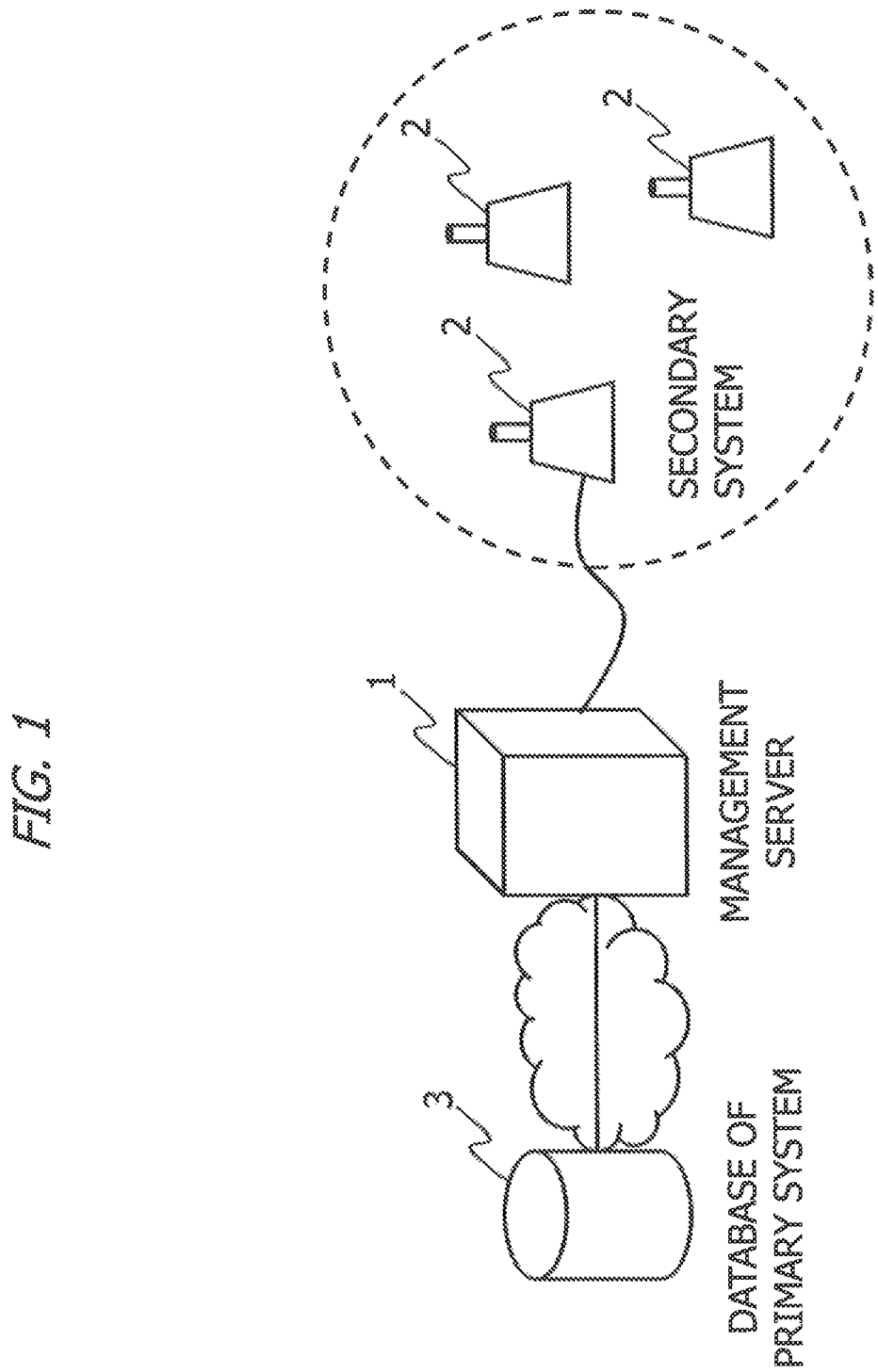
FIG. 1 is a diagram illustrating a configuration example of a network system provided with a cognitive radio technique.

FIG. 1 is a diagram illustrating a configuration example of a network system provided with a cognitive radio technique according to a first embodiment. The network system includes a first communication system and a second communication system different from the first communication system. A frequency band allocated to the first communication system will be referred to as a first frequency band, and band of all or part of the first frequency band included in the first frequency band will be referred to as a second frequency band. Hereinafter, a primary system will be described as an example of the first communication system, and a secondary system will be described as an example of the second communication system. The network system includes a management server 1, a plurality of communication apparatuses 2 in the secondary system, and a database 3 of the primary system.

The primary system is, for example, a communication system that can preferentially use a predetermined frequency band. The primary system is, for example, a TV broadcast system, a radio broadcast system, a disaster prevention wireless system, or the like. Hereinafter, the preferential use of the predetermined frequency band by the primary system will be called primarily using the frequency band or primary use of the frequency band. A used frequency band allocated to the primary system is an example of a "first frequency band".

The database 3 of the primary system is, for example, a database of an administrative management organ, a database of a government of the primary system, a database of a third party organization, or the like. Frequency use information of the primary system is stored in the database 3 of the primary system. The frequency use information is information related to communication characteristics of the primary system. Specifically, the frequency use information includes, for example, used frequency band of primary system, used time zone, location of transmission station, transmission power, used polarization mode, transmission antenna pattern, communication mode, movement speed of transmission station of primary system, and the like. The frequency use information may also include predetermined conditions to be met for a reception station to receive a radio wave transmitted by the primary system. The predetermined conditions for receiving the radio wave transmitted by the primary system include, for example, location of reception station, needed reception quality, reception antenna pattern, and the like. The transmission or reception antenna pattern is, for example, a gain pattern of an antenna included in the transmission station or the reception station. The needed reception quality is, for example, a reception power to interference power ratio preferable to receive a service of the primary system. The frequency use information may also include, for example, information of a band in which the use (secondary use) by a different communication system is not permitted (secondary use unavailable band).

The secondary system is a communication system that uses a predetermined frequency band primarily used by the primary system on condition that the interference with the wireless signal of the primary system is avoided. The communication apparatus 2 of the secondary system is a wireless communication apparatus including a sensing device and is, for example, a base station, a portable phone terminal, a smartphone, a portable information terminal, a car navigation, or the like including the sensing device. The sensing device is a device for sensing a wireless signal. The communication apparatus 2 of the secondary system executes a sensing process to confirm that the primary system is not using a frequency band desired to be used, before the start of communication. The sensing process executed by the communication apparatus 2 of the secondary system is a process for sensing the existence of a wireless signal in a predetermined frequency band. Specifically, the sensing process is a process of executing a predetermined calculation related to field intensity of a reception signal in a predetermined frequency band and determining the existence of a wireless signal if the calculation result is equal to or greater than a predetermined threshold. The predetermined calculation related to the field intensity of the reception signal is a calculation according to the sensing method. Hereinafter, the use of the frequency band primarily used by the primary system on condition that the interference with the wireless signal from the primary system is avoided will be called secondarily using or secondary use. In the present specification, a white space will be referred to as a secondarily usable frequency band.

The management server 1 is a server that holds information related to the white space. The management server 1 can access the database 3 of the primary system through a network such as, for example, the Internet and a LAN (Local Area Network). The management server 1 also transmits the information related to the white space to the communication apparatus 2 of the secondary system through a wireless or wired network. Examples of the wireless network between the management server 1 and the communication apparatus 2 of the secondary system include a portable phone network, a wireless LAN, and the like. When the management server 1 and the communication apparatus 2 of the secondary system are connected to the wireless network, the communication between the management server 1 and the communication apparatus 2 of the secondary system is performed by using, for example, a predetermined frequency.

In the network system illustrated in FIG. 1, the management server 1 and the communication apparatus 2 of the secondary system perform the following operation.

The management server 1 accesses the database 3 of the primary system at, for example, a predetermined cycle to acquire the frequency use information of the primary system. However, the operation is not limited to this, and the management server 1 may be triggered by a predetermined event to access the database 3 of the primary system. From the acquired frequency use information of the primary system, the management server 1 calculates and stores information of the secondarily usable frequency band and information related to the primary system in the secondarily usable frequency band. The information related to the primary system is, for example, information related to the sensing method of the wireless signal used by the primary system. Hereinafter, the information of the secondarily usable frequency band will be called white space information (WS information).

The communication apparatus 2 of the secondary system notifies the management server 1 of location information of the communication apparatus 2 and sensing capability information of the communication apparatus 2. The sensing capability information includes information of performance of hardware included in the communication apparatus 2, information of sensing methods that can be executed by the communication apparatus 2, and the like. Specifically, the sensing capability information includes communication characteristics of the communication apparatus 2, such as, for example, sensing available frequency bands, sensing sensitivity, validity of detection of cyclostationarity, validity of directional sensing, polarization modes that can be handled, and transmission power.

Through the included hardware, the communication apparatus 2 can execute a plurality of sensing methods, such as, for example, energy detection, detection of cyclostationarity, and directional sensing. First, the communication apparatus 2 including a sensing device can perform sensing by the energy detection. In the sensing by the energy detection, for example, the communication apparatus 2 measures reception power of a reception signal, converts the reception power to obtain field intensity, and determines the existence of a signal from the primary system if the field intensity is equal to or greater than a predetermined threshold.

In the sensing by the detection of cyclostationarity, the communication apparatus 2 detects periodicity of a received wireless signal (for example, amplitude, phase, or the like) to determine that a signal is from a predetermined primary system. The cyclostationarity of a wireless signal is generated by modulation by a predetermined modulation mode, such as, for example, OFDM (Orthogonal Frequency Division Multiplexing), in the primary system. For example, when Cyclic Prefix is used as a guard interval as in the OFDM, signals (guard intervals) with the same amplitude and phase are transmitted before and after a frame including data. More specifically, if the wireless signal is cyclostationary, the length of the frame including data and the length of the guard interval are determined in advance, and a signal with the same amplitude and the phase appears at a predetermined interval t combining the frame length and the guard interval length. The detection of cyclostationarity of a reception signal is performed based on, for example, whether there is a section where an autocorrelation value between the reception signal and a reception signal delayed by the predetermined interval t is 1 (correlation is strong). While there is a signal with cyclostationarity in the time direction, there is also a signal with cyclostationarity in the frequency direction. Therefore, the predetermined interval t is a time length or a frequency. Since the value of the predetermined interval t is different in each primary system, it can be determined that the reception signal is from a specific primary system if the cyclostationarity is detected at the predetermined interval t.

The directional sensing is sensing in which the largest gain direction of the antenna is adjusted to a specific direction to perform sensing, and the existence of the wireless signal is sensed if the field intensity obtained as a result of the sensing is equal to or greater than a predetermined threshold. The directional sensing detection is valid when the communication apparatus 2 includes a directional antenna. The directional sensing can also be used together with other sensing methods.

The sensing sensitivity of the communication apparatus 2 changes according to the sensing method. Therefore, when the sensing sensitivity is transmitted as the sensing capability information, corresponding sensing methods are also included in the sensing capability information.

The communication apparatus 2 may include all of specification information of the hardware of the communication apparatus 2, information of the sensing methods that can be executed, and the like in one piece of sensing capability information, or the communication apparatus 2 may include one set of information in one piece of sensing capability information and transmit a plurality of pieces of sensing capability information. It is assumed in the first embodiment that the communication apparatus 2 includes one set of information in one piece of sensing capability information and transmits a plurality of pieces of sensing capability information. The one set of information is, for example, information of a sensing available frequency, a combination of a sensing method that can be executed and sensing sensitivity, a polarization mode that can be handled, and the like. For example, the communication apparatus 2 transmits, to the management server 1, both of the sensing capability information including the sensing sensitivity in the energy detection when the directional sensing is invalid and the sensing capability information including the sensing sensitivity in the energy detection when the directional sensing is valid. The process by the communication apparatus 2 notifying the management server 1 of the location information of the communication apparatus 2 and the sensing capability information is executed, for example, before or after the transmission of a connection request if the communication apparatus 2 is a terminal apparatus.

When the location information and the sensing capability information are received from the communication apparatus 2 of the secondary system, the management server 1 selects a frequency band that can be secondarily used based on the information. The management server 1 generates sensing auxiliary information that is information related to the sensing method in the frequency band based on the selected frequency band that can be secondarily used and based on the information related to the primary system in the frequency band stored in the management server 1. The sensing auxiliary information is an example of "capability information indicating sensing capability of sensing a wireless signal". The management server 1 may further generate sensing auxiliary information adapted to the communication apparatus 2 based on the location information and the sensing capability information of the communication apparatus 2 received from the communication apparatus 2. The management server 1 transmits, to the communication apparatus 2, the white space (WS) information that is information of the selected frequency band that can be secondarily used and the generated sensing auxiliary information. The sensing auxiliary information includes, for example, sensing sensitivity which allows the communication apparatus 2 to sense the existence of the wireless signal of the primary system (hereinafter, needed sensing sensitivity), validity of the cyclostationary detection of the wireless signal of the primary system, validity of the directional sensing, direction of the directional antenna recommended for the communication apparatus 2, polarization mode of the wireless signal of the primary system, and the like.

When the WS information and the sensing auxiliary information are received from the management server 1, the communication apparatus 2 of the secondary system performs the setting of the antenna and the sensing device based on the information. Subsequently, the communication apparatus 2 performs sensing to detect a white space and uses the detected white space to start communication. The white space is an example of a "second frequency band".

As the sensing auxiliary information is transmitted from the management server 1 to the communication apparatus 2 of the secondary system, the communication apparatus 2 performs sensing based on the sensing auxiliary information. As a result, the communication apparatus 2 can perform the sensing in a state (or parameters) suitable for the corresponding primary system and the corresponding frequency band when the frequency band allocated to the primary system is secondarily used. This can reduce the time taken for sensing, and this improves the sensing sensitivity and accuracy. More specifically, the management server 1 can improve the processing efficiency in the sensing of the communication apparatus 2.

<Apparatus Configurations>
<Management Server>

Figure 2:
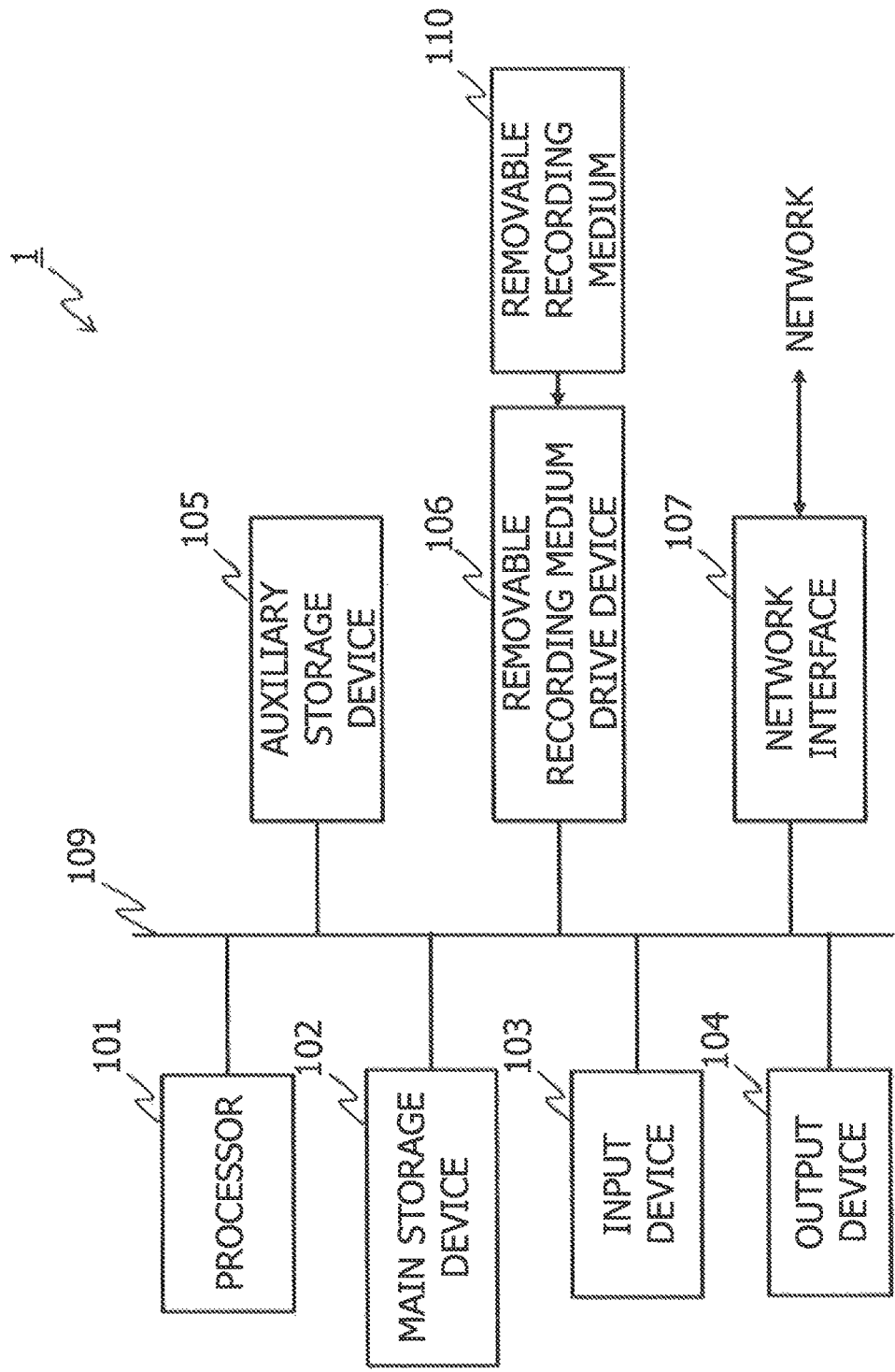
FIG. 2 is a diagram illustrating an example of a hardware configuration of a management server.

FIG. 2 is a diagram illustrating an example of a hardware configuration of the management server 1. The management server 1 is an information processing apparatus. The information processing apparatus is, for example, a general-purpose computer or a dedicated server computer. The management server 1 includes a processor 101, a main storage device 102, an input device 103, an output device 104, an auxiliary storage device 105, a removable recording medium drive device 106, and a network interface 107. In the management server 1, these are connected to each other by a bus 109. The management server 1 may also be, for example, a base station.

The network interface 107 is an interface for inputting and outputting information to and from the network. The network interface 107 is an example of a transmission unit or a reception unit that connects to a wired and/or wireless network to transmit or receive a signal to and from the network. The communication between the management server 1 and the communication apparatus 2 of the secondary system as well as the communication between the management server 1 and the database 3 of the primary system are performed through the network interface 107. The network interface 107 is an interface module, such as, for example, SONET/SDH (Synchronous Optical NETwork/Synchronous Digital Hierarchy), ATM (Asynchronous Transfer Mode), and NIC (Network Interface Card). The network interface 107 may also be a circuit connected to an antenna (not illustrated) to process a wireless signal input to or output from the antenna. The data and the like received by the network interface 107 are output to the processor 101.

The input device 103 is, for example, a keyboard, a pointing device such as a mouse, a scanner, or the like. The data input from the input device 103 is output to the processor 101.

The main storage device 102 provides the processor 101 with a storage area and a work area for loading a program stored in the auxiliary storage device 105 or is used as a buffer. The main storage device 102 is, for example, a semiconductor memory such as a RAM (Random Access Memory).

The auxiliary storage device 105 stores various programs and data used by the processor 101 in the execution of the programs. The auxiliary storage device 105 is, for example, an EPROM (Erasable Programmable ROM) or a hard disc drive (Hard Disc Drive). The auxiliary storage device 105 holds, for example, an operating system (OS), an information processing program of cognitive radio, and other various application programs.

The removable recording medium drive device 106 reads programs and various data recorded in the removable recording medium and outputs them to the processor 101. The portable recording medium is a recording medium, such as, for example, a USB (Universal Serial Bus) flash memory, a CD (Compact Disc), a DVD (Digital Versatile Disk), and a flash memory card.

The processor 101 is, for example, a CPU (Central Processing Unit). The processor 101 loads, on the main storage device 102, the OS and various application programs held by the auxiliary storage device 105 or the removable recording medium and executes them to execute various processes.

For example, in the management server 1, the processor 101 loads, on the main storage device 102, the information processing program of cognitive radio held by the auxiliary storage device 105 and executes the program. Through the execution of the information processing program of cognitive radio, the management server 1 accesses the database 3 of the primary system at a predetermined cycle and acquires the frequency use information of the primary system. Through the execution of the information processing program of cognitive radio, the management server 1 also generates WS information and sensing auxiliary information based on the sensing capability information of the communication apparatus 2 of the secondary system and transmits the information to the communication apparatus 2.

The output device 104 outputs results of processes by the processor 101. The output device 104 includes a display and the like.

Figure 3:
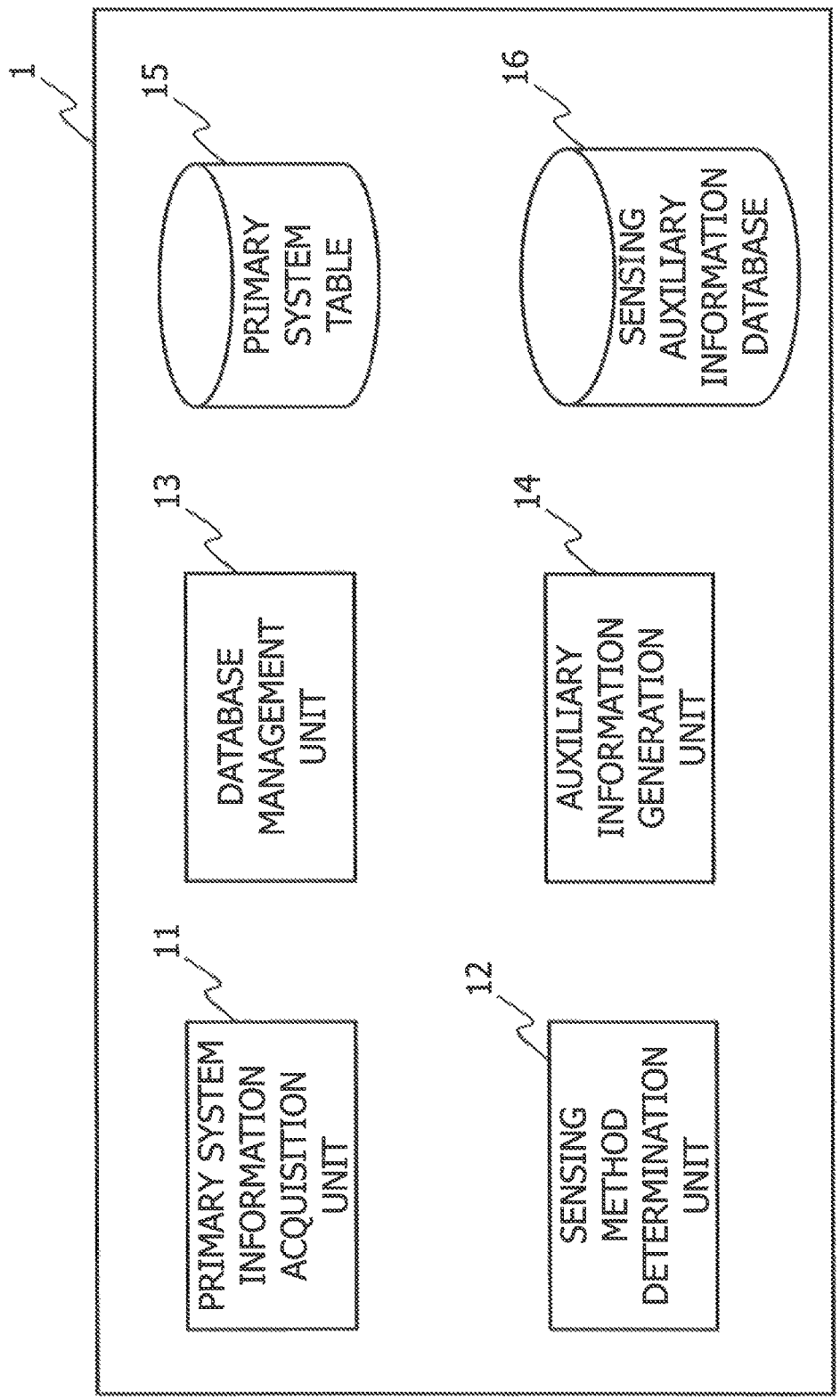
FIG. 3 is a diagram illustrating an example of functional blocks of the management server and information stored in the management server.

FIG. 3 is a diagram illustrating an example of functional blocks of the management server 1 and information stored in the management server 1. The processor 101 of the management server 1 loads, on the main storage device 102, the information processing program of cognitive radio held by the auxiliary storage device 105 to execute the program. Through the execution of the information processing program of cognitive radio, the management server 1 operates as a primary system information acquisition unit 11, a sensing method determination unit 12, a database management unit 13, and an auxiliary information generation unit 14. Through the loading or execution of the information processing program of cognitive radio, a primary system table 15 and a sensing auxiliary information database 16 are created in the storage area of the main storage device 102.

The primary system information acquisition unit 11 accesses the database 3 of the primary system at a predetermined cycle and acquires the frequency use information of the primary system. The predetermined cycle is, for example, once a day, once in 12 hours, or the like. However, the execution of the access to the database 3 of the primary system is not limited to the predetermined cycle, and for example, the access is also executed according to requests from other functional blocks.

When the frequency use information is acquired from the primary system, the primary system information acquisition unit 11 checks whether there is an update from the frequency use information of the primary system acquired last time, in the frequency use information acquired this time. If there is no update from the last time in the frequency use information acquired this time, the frequency use information of the primary system is transmitted to the database management unit 13.

If there is an update from the last time in the frequency use information acquired this time, the primary system information acquisition unit 11 transmits the frequency use information acquired this time to the sensing method determination unit 12. If the frequency use information of the primary system is acquired for the first time, the primary system information acquisition unit 11 notifies the sensing method determination unit 12 of the frequency use information. The primary system information acquisition unit 11 is an example of an "acquisition unit".

The sensing method determination unit 12 receives the frequency use information of the primary system from the primary system information acquisition unit 11, and determines change the secondarily usable frequency band and the sensing method for the primary system based on the frequency use information.

For example, the sensing method determination unit 12 acquires sensing sensitivity needed for the communication apparatus 2 (hereinafter, needed sensing sensitivity) to sense the existence of the wireless signal of the primary system. The needed sensing sensitivity of the primary system is defined by, for example, a radio wave management organization, a standardization organization, or the like. The sensing method determination unit 12 stores, for example, the needed sensing sensitivity defined for each primary system as a table (not illustrated) and acquires, from the table, the needed sensing sensitivity defined for the primary system in the frequency use information.

For example, the sensing method determination unit 12 determines validity of directional sensing in the sensing of the wireless signal of the primary system. When the transmission station or the reception station moves at a high speed, it is difficult to predict or capture the direction of directivity, and the directional sensing becomes invalid. Therefore, to determine the validity of the directional sensing for the primary system, the sensing method determination unit 12 determines whether the movement speed of the transmission station of the primary system is greater than a predetermined threshold. If the movement speed of the transmission station of the primary system is greater than the threshold, the sensing method determination unit 12 determines that the directional sensing for the primary system is invalid. If the movement speed of the transmission station of the primary system is equal to or smaller than the threshold, the sensing method determination unit 12 determines that the directional sensing for the primary system is valid. The movement speed of the transmission station of the primary system is included in, for example, the frequency use information acquired from the primary system.

Furthermore, for example, the sensing method determination unit 12 determines the validity of sensing by the detection of cyclostationarity of the wireless signal used in the primary system. To determine the validity of sensing by the detection of cyclostationarity of the wireless signal used in the primary system, the sensing method determination unit 12 determines, for example, whether the modulation mode used in the primary system is a modulation mode that makes the wireless signal cyclostationary. Examples of the modulation mode that makes the wireless signal cyclostationary includes OFDM, QPSK (Quaternary Phase-Shift Keying), and the like. Alternatively, since the used modulation mode is determined according to the type of network (for example, LTE (Long Term Evolution), wireless LAN), the sensing method determination unit 12 may determine the validity of the detection of cyclostationarity based on the type of the network used by the primary system.

If the modulation mode used in the primary system is not a modulation mode that makes the wireless signal cyclostationary, the sensing method determination unit 12 determines that the sensing by the detection of cyclostationarity is invalid in the primary system. If the modulation mode used in the primary system is a modulation mode that makes the wireless signal cyclostationary, the sensing method determination unit 12 determines that the sensing by the detection of cyclostationarity is valid in the primary system. The modulation mode used in the primary system and the type of the network used by the primary system are included in, for example, the frequency use information of the primary system.

The sensing method determination unit 12 transmits the determination result of the sensing method for the primary system and the frequency use information to the database management unit 13. The frequency use information may be transmitted from the primary system information acquisition unit 11 to the database management unit 13.

The database management unit 13 manages and reads data of the primary system table 15 and the sensing auxiliary information database 16. When the frequency use information of the primary system is received from the primary system information acquisition unit 11 or the sensing mode determination unit 12, the database management unit 13 stores the information in, for example, the sensing auxiliary information database 16. At a timing of a predetermined cycle or reception of the frequency use information, for example, the database management unit 13 compares the used time zone included in the received frequency use information and the current time, and determines whether the frequency band included in the frequency use information can be secondarily used. If the corresponding frequency band can be secondarily used, the corresponding frequency band is registered in the primary system table 15, or the corresponding entry is updated. Furthermore, when, for example, the determination result of the sensing method for the primary system is received from the sensing method determination unit 12, the database management unit 13 registers the result in the sensing auxiliary information database 16 (described later) or updates the corresponding entry. An expiration period can be set for the entry of the sensing auxiliary information database 16. The database management unit 13 resets the expiration period of the entry, for example, when the reception of the frequency use information of the primary system is notified from the primary system information acquisition unit 11 or when the entry is updated. When the expiration period of the entry of the sensing auxiliary information database 16 is expired, the database management unit 13 invalidates the entry.

When the sensing capability information is received from the communication apparatus 2 of the secondary system, the auxiliary information generation unit 14 selects, as a frequency band to be reported to the communication apparatus 2, a secondarily usable frequency band according to the received sensing capability information and generates WS information.

For example, if the sensing capability information received from the communication apparatus 2 indicates that the communication apparatus 2 does not have sensing capability, the auxiliary information generation unit 14 selects a frequency band of a static white space. The static white space denotes a frequency band that is not used by any primary system. Furthermore, if, for example, the sensing capability information received from the communication apparatus 2 indicates information related to the sensing available frequency bands of the communication apparatus 2, the auxiliary information generation unit 14 selects a secondarily usable frequency band included in the sensing available frequency bands of the communication apparatus 2. Furthermore, if, for example, the sensing capability information received from the communication apparatus 2 indicates information that the sensing by the cyclostationary detection is valid in the communication apparatus 2, the auxiliary information generation unit 14 selects a secondarily usable frequency band in which the sensing of the cyclostationary detection is valid. This is because whether the primary system uses the frequency band can be more easily determined in the sensing based on the cyclostationary detection, compared to sensing not based on the cyclostationary detection. Furthermore, for example, if the sensing capability information received from the communication apparatus 2 indicates information that the directional sensing is valid in the communication apparatus 2, the auxiliary information generation unit 14 selects a secondarily usable frequency band in which the directional sensing is valid. This is because compared to non-directional sensing, the directional sensing can increase the sensitivity to determine the frequency band used by the primary system. The auxiliary information generation unit 14 includes the selected frequency band that can be secondarily used in the WS information and transmits the information to the communication apparatus 2.

The auxiliary information generation unit 14 generates the sensing auxiliary information based on, for example, the sensing auxiliary information database 16 holding the information of the primary system that uses the frequency band included in the WS information, the sensing capability information from the communication apparatus 2, the location information of the communication apparatus 2, and the like.

For example, the auxiliary information generation unit 14 includes, in the sensing auxiliary information, the information of the needed sensing sensitivity of the primary system that uses the frequency band included in the WS information. The information of the needed sensing sensitivity of each primary system is stored in, for example, the sensing auxiliary information database 16 (described later). Furthermore, for example, the sensing auxiliary information includes information of the bandwidth used by the primary system in the frequency band included in the WS information. The information of the bandwidth used by the primary system indicates, for example, information that the bandwidth is used at 10 MHz intervals (increments) between 300 MHz and 400 MHz.

For example, if the sensing by the detection of cyclostationarity is valid in the primary system that uses the frequency band included in the WS information, the sensing auxiliary information includes the following information. The sensing auxiliary information includes the validity of the sensing by the detection of cyclostationarity in the primary system that uses the frequency band included in the WS information, the fact that one of the time direction, the frequency direction, the size of autocorrelation, the phase, the dispersion, and the like is cyclostationary, the pattern (cycle, time length, and the like) of the cyclostationarity, and the like. The information of the pattern of the cyclostationarity indicates, for example, information that the section of the guard interval is 6 MHz×100 μs and that the predetermined interval t is 900 μs.

For example, if the directional sensing is valid in the primary system that uses the frequency band included in the WS information, the sensing auxiliary information includes the following information. The auxiliary information generation unit 14 calculates values of setting parameters of the antenna recommended for the sensing, from the location relationship between the primary system and the communication apparatus 2 of the secondary system in the frequency band included in the WS information. The setting parameters of the antenna are, for example, the direction of arrival of signal, the angle of elevation, and the like. The auxiliary information generation unit 14 includes, in the sensing auxiliary information, the calculated values of the setting parameters of the antenna recommended for the sensing.

For example, if the sensing by the matched filter is effective in the primary system that uses the frequency band included in the WS information, the sensing auxiliary information includes information related to the signal pattern, such as used series, time length, and transmission rate. Furthermore, for example, if the sensing by the eigenvalue analysis is valid in the primary system that uses the frequency band included in the WS information, the sensing auxiliary information includes the number of signals used by the primary system. This is because, for example, a plurality of signals are transmitted in MIMO (Multiple Input Multiple Output) communication and the like. For example, if a time limit is set to the WS information or the sensing auxiliary information, the auxiliary information generation unit 14 includes information related to the valid time in the sensing auxiliary information. Furthermore, for example, if a time zone in which the primary system of the secondarily usable frequency band included in the WS information does not use the corresponding frequency band is recognized, the auxiliary information generation unit 14 may include the time zone of the corresponding frequency band that can be secondarily used.

The WS information and the sensing auxiliary information generated by the auxiliary information generation unit 14 are transmitted to the communication apparatus 2 of the secondary system through the network interface 107.

FIG. 4A is an example of the primary system table 15. The primary system table 15 stores frequency bands that can be white spaces (secondarily usable frequency bands) and primary systems allocated to the frequency bands. The allocation of the primary systems to the frequency bands is determined for each region by an administrative organ, for example. In the example illustrated in FIG. 4A, the primary systems are identified by identification numbers. For example, in the frequency band of frequency fd-fe illustrated in FIG. 4A, a system 3001 of TV broadcast and a system 3002 of radio microphone are registered as the primary systems that primarily use the frequency band. In this way, there are also frequency bands shared by a plurality of primary systems in a time direction or a frequency direction.

The database management unit 13 registers and further updates the entries of the primary system table 15 based on the frequency use information acquired by the primary system information acquisition unit 11.

FIG. 4B is an example of the information stored in the sensing auxiliary information database 16. The sensing auxiliary information database 16 stores information related to the sensing methods for the primary systems. Items as standards for determining whether to report as the secondarily usable frequency band to the communication apparatus 2 that is the transmission source of the sensing capability information are stored in the example of the sensing auxiliary information database 16 illustrated in FIG. 4B. Specifically, the needed sensing sensitivity in each primary system, the validity of sensing by the cyclostationary detection, the validity of the directional sensing, and the expiration period are stored in the example of the sensing auxiliary information database 16 illustrated in FIG. 4B. However, the sensing auxiliary information database 16 illustrated in FIG. 4B is an example, and the information stored in the sensing auxiliary information database 16 is not limited to this. Other than the information illustrated in FIG. 4B, the sensing auxiliary information database 16 may include items as determination standards for selecting the secondarily usable frequency band reported to the communication apparatus 2. For example, items, such as a polarization mode and location information of the transmission station of the primary system, may be stored in the sensing auxiliary information database 16. Furthermore, the sensing auxiliary information database 16 may store, for example, information whose knowledge is beneficial for the communication apparatus 2 of the secondary system in the sensing, such as used frequency band in each primary system, increments of used bandwidth, and values of parameters in each sensing method. The sensing auxiliary information database 16 may further store the frequency use information acquired by the primary system information acquisition unit 11.

Figure 5:
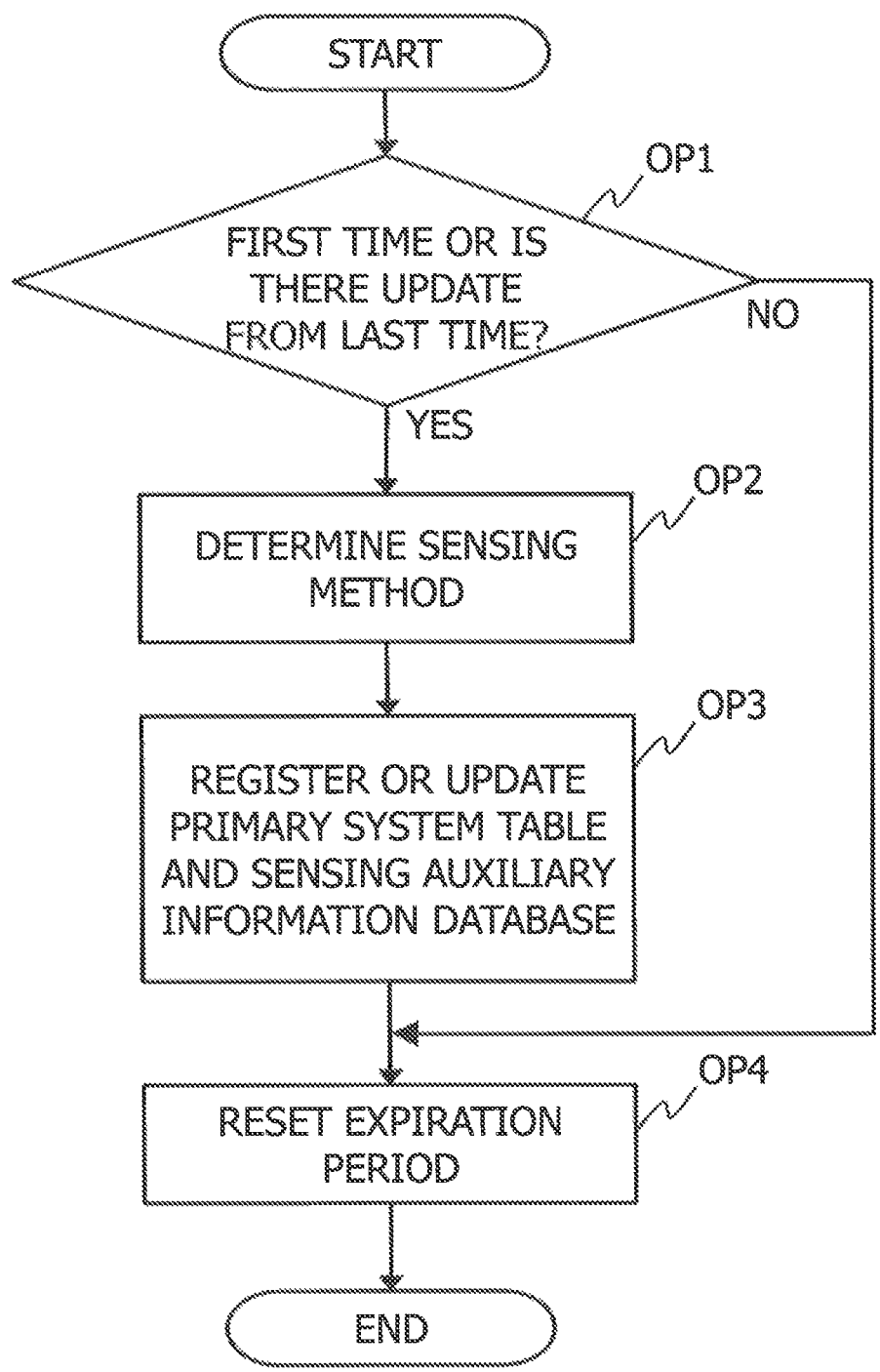
FIG. 5 is a diagram illustrating an example of a flow chart of a process related to management of the primary system table and the sensing auxiliary information database.

FIG. 5 is a diagram illustrating an example of a flow chart of a process related to management of the primary system table 15 and the sensing auxiliary information database 16. The entity of the process of the flow chart of FIG. 5 is the processor 101 that executes the information processing program. However, for the convenience, the primary system information acquisition unit 11, the sensing method determination unit 12, and the database management unit 13 as functional blocks attained by the execution of the information processing program by the processor 101 will be described below as the entities of the process. The process of the flow chart illustrated in FIG. 5 is started when the primary system information acquisition unit 11 acquires the frequency use information of the primary system.

In OP1, the primary system information acquisition unit 11 determines whether the frequency use information of the primary system is acquired for the first time or the acquired frequency use information of the primary system is updated from the information acquired last time. The frequency use information of the primary system acquired last time is stored in, for example, the sensing auxiliary information database 16. If the frequency use information of the primary system is acquired for the first time or if the acquired frequency use information of the primary system is updated from the last time (OP1: Yes), the primary system information acquisition unit 11 transmits the frequency use information to the sensing method determination unit 12. Subsequently, the process proceeds to OP2. If the acquired frequency use information of the primary system is not updated from the last time (OP1: No), the primary system information acquisition unit 11 transmits the frequency use information to the database management unit 13. Subsequently, the process proceeds to OP4.

In OP2, the sensing method determination unit 12 determines the sensing method of the primary system based on the received frequency use information. In the determination of the sensing method, as described above, the acquisition of the needed sensing sensitivity of the primary system, the determination of the validity of the sensing by the detection of cyclostationarity, the determination of the validity of the directional sensing, and the like are performed. The sensing method determination unit 12 transmits the determination result of the sensing method of the primary system and the frequency use information to the database management unit 13. Next, the process proceeds to OP3.

In OP3, the database management unit 13 stores, in the sensing auxiliary information database 16, or updates the determination result of the sensing method of the primary system and the frequency use information received from the sensing method determination unit 12. Furthermore, for example, the database management unit 13 determines the availability of the secondary use of the used frequency band of the primary system included in the frequency use information, from the current time and the used time zone included in the frequency use information. If the used frequency band of the primary system is secondarily useable, this is registered or updated in the primary system table 15. Next, the process proceeds to OP4.

In OP4, the database management unit 13 resets the expiration period of the entry of sensing auxiliary information database 16 corresponding to the received frequency use information. Subsequently, the process of the flow chart illustrated in FIG. 5 is finished.

However, the process related to the management of the primary system table 15 and the sensing auxiliary information database 16 is not limited to the process illustrated in FIG. 5. For example, the primary system table 15 and the sensing auxiliary information database 16 may store information related to the primary system input by the administrator from the management terminal of the management server 1.

FIGS. 6A and 6B are examples of flow charts of processes by the auxiliary information generation unit 14. The entity of the process of FIGS. 6A and 6B are the processor 101 that executes the information processing program. However, for the convenience, the auxiliary information generation unit 14 as one of the functional blocks that are attained by the execution of the information processing program by the processor 101 will be described below as the entity of the process. The process of the flow chart illustrated in FIG. 6A is started when the auxiliary information generation unit 14 receives the sensing capability information from the communication apparatus 2 of the secondary system.

In OP11, the auxiliary information generation unit 14 determines whether there is sensing capability information including the information of the sensing available frequency band of the communication apparatus 2 among the received sensing capability information. If there is sensing capability information including the information of the sensing available frequency band of the communication apparatus 2 (OP11: Yes), the process proceeds to OP12. If there is no sensing capability information including the information of the sensing available frequency band of the communication apparatus 2 (OP11: No), the process proceeds to OP13.

In OP12, the auxiliary information generation unit 14 extracts entries of frequency bands that partially or entirely overlap with the sensing available frequency band of the communication apparatus 2 from the primary system table 15. The auxiliary information generation unit 14 sequentially provides the extracted entries of the primary system table 15 with numbers from 1. Next, the process proceeds to OP14.

In OP13, since the management server 1 has not received the sensing capability information including the sensing available frequency band of the communication apparatus 2, the auxiliary information generation unit 14 extracts all entries of the primary system table 15. The auxiliary information generation unit 14 sequentially provides the extracted entries of the primary system table 15 with numbers from 1. Next, the process proceeds to OP14.

In OP14, the auxiliary information generation unit 14 sets a variable k to 1 that is an initial value. The variable k is a pointer indicating an entry to be processed extracted from the primary system table 15 and is a value in a range of $1 \leq k \leq K$. K denotes a total number of the entries extracted from the primary system table 15 and is a natural number excluding 0. Hereinafter, the frequency band of an entry of the primary system table 15 will be described as a frequency band Fk (k is a variable).

In OP15, the auxiliary information generation unit 14 executes a notification determination process of the frequency band Fk. The notification determination process of the frequency band Fk is a process of determining whether to include the frequency band Fk in the WS information to notify the communication apparatus 2 of the information. Details of the notification determination process of the frequency band Fk will be described later in FIG. 6B.

In OP16, the auxiliary information generation unit 14 determines whether the variable k and the constant K are the same values. More specifically, in OP16, the auxiliary information generation unit 14 determines whether the notification determination process is executed for all entries (frequency bands) extracted from the primary system table 15. If the variable k and the constant K are the same values (OP16: Yes), the process proceeds to OP18. If the variable k and the constant K are not the same values (OP16: No), the process proceeds to OP17.

In OP17, the auxiliary information generation unit 14 adds 1 to the variable k to update the variable k. Subsequently, the processes from OP15 to OP17 are repeated until the notification determination process is executed for all entries (frequency bands) extracted from the primary system table 15.

In OP18, the auxiliary information generation unit 14 generates WS information and sensing auxiliary information. The WS information is generated by including the frequency band that is included in a notification list (described later) and that is determined to be able to be reported to the communication apparatus 2 in the notification determination process of OP15. In this case, for the frequency band that is determined to be able to be reported to the communication apparatus 2 and that partially overlaps with the sensing available frequency band of the communication apparatus 2, the auxiliary information generation unit 14 may include, in the WS information, the part overlapping with the sensing available frequency band of the communication apparatus 2.

The auxiliary information generation unit 14 also generates sensing auxiliary information based on the information related to the primary system that primarily uses the frequency band determined to be able to be reported to the communication apparatus 2 in the notification determination process of OP15. The sensing auxiliary information includes, for example, information that is stored in the management server 1, such as information registered in the primary system table 15, and that is related to the primary system that primarily uses the frequency band determined to be able to be reported to the communication apparatus 2. Furthermore, for example, the auxiliary information generation unit 14 may select, according to the received sensing capability information, information that is stored in the management server 1 and that is related to the primary system which primarily uses the frequency band determined to be able to be reported to the communication apparatus 2 and may include the information in the sensing auxiliary information. When the values of the parameters that vary depending on the communication apparatus 2 or the primary system are included in the sensing auxiliary information, the auxiliary information generation unit 14 calculates the values of the parameters from the sensing capability information, the location information of the communication apparatus 2, the information of the primary system, and the like. For example, when the sensing auxiliary information includes the information related to the directional sensing, the auxiliary information generation unit 14 calculates setting information (direction of arrival of signal, angle of elevation, and the like) of the antenna of the communication apparatus 2 from the location information of the communication apparatus 2 and the transmission station of the primary system and includes the information in the sensing auxiliary information. Next, the process proceeds to OP19.

In OP19, the auxiliary information generation unit 14 outputs the generated WS information and sensing auxiliary information. Subsequently, the process of the flow chart of FIG. 6A is finished.

FIG. 6B is an example of the flow chart of the notification determination process of the frequency band Fk in FIG. 6A. The process of the flow chart illustrated in FIG. 6B is started when the process of OP14 of FIG. 6A is finished.

In OP21, the auxiliary information generation unit 14 sets a variable m to an initial value 1. The variable m is a value in a range of 1≤m≤M. The constant M denotes a total number of the primary systems allocated to the frequency band Fk in the primary system table 15. The variable m is a pointer of the primary system allocated to the entry of the frequency band Fk in the primary system table 15. The variable m indicates the sensing capability information, randomly or in the order of registration in the primary system table, for example. Next, the process proceeds to OP22.

When a plurality of primary systems share the frequency band Fk in the time direction or the frequency direction, the communication apparatus 2 secondarily uses the frequency band Fk on condition that the interference with all of the primary systems that share the frequency band Fk is avoided. For example, in the frequency band Fk shared by a TV broadcast system and a radio microphone, the communication apparatus 2 executes the sensing process for each system and performs the secondary use at a frequency and time not used by any primary system. Therefore, if there are a plurality of primary systems allocated to the entry of the frequency band Fk extracted from the primary system table 15, the management server 1 executes the notification determination process of the frequency band Fk for each primary system.

In OP22, the auxiliary information generation unit 14 sets a variable n to 1 that is an initial value. The variable n is a value in a range of 1≤n≤N. The constant N denotes the number of pieces of the sensing capability information received from the communication apparatus 2 of the secondary system. The variable n is a pointer indicating the sensing capability information received from the communication apparatus 2 of the secondary system. The variable n indicates the sensing capability information, randomly or in the order of reception, for example. Next, the process proceeds to OP23.

In OP23, the auxiliary information generation unit 14 determines whether the sensing sensitivity of the communication apparatus 2 included in an n-th piece of sensing capability information satisfies the needed sensing sensitivity of an m-th primary system stored in the sensing auxiliary information database 16. Specifically, the auxiliary information generation unit 14 determines whether the sensing sensitivity of the communication apparatus 2 included in the n-th piece of sensing capability information is greater than the needed sensing sensitivity of the m-th primary system stored in the sensing auxiliary information database 16. If the sensing sensitivity of the communication apparatus 2 included in the n-th piece of sensing capability information satisfies the needed sensing sensitivity of the m-th primary system (OP23: Yes), the process proceeds to OP24. If the sensing sensitivity included in the n-th piece of sensing capability information does not satisfy the needed sensing sensitivity of the m-th primary system (OP23: No), the process proceeds to OP29. If the n-th piece of sensing capability information does not include the information of the sensing sensitivity of the communication apparatus 2, the process proceeds to OP29.

In OP24, the auxiliary information generation unit 14 determines whether the sensing sensitivity included in the n-th piece of sensing capability information is based on a sensing method other than the energy detection. Examples of the sensing method other than the sensing method based on the energy detection include detection of cyclostationarity, matched filter, eigenvalue analysis, and the like. In OP24, since the directional sensing can be used together with other sensing methods, the auxiliary information generation unit 14 determines that the sensing sensitivity based on the energy detection when the directional sensing is valid is also based on a sensing method other than the energy detection. If the sensing sensitivity included in the n-th piece of sensing capability information is based on a sensing method other than the energy detection (OP24: Yes), the process proceeds to OP25. If the sensing sensitivity included in the n-th piece of sensing capability information is based on a sensing method based on the energy detection when the directional sensing is invalid (OP24: No), the process proceeds to OP26.

In OP25, the auxiliary information generation unit 14 determines whether the sensing method other than the energy detection included in the n-th piece of sensing capability information is valid in the m-th primary system of the frequency band Fk. If the sensing method other than the energy detection included in the n-th piece of sensing capability information is valid in the m-th primary system of the frequency band Fk (OP25: Yes), the process proceeds to OP26. If the sensing method other than the energy detection included in the n-th piece of sensing capability information in the m-th primary system of the frequency band Fk is invalid (OP25: No), the process proceeds to OP29.

In OP26, the auxiliary information generation unit 14 adds 1 to the variable m to update the variable m. In OP27, the auxiliary information generation unit 14 determines whether the variable m is greater than the constant M. If the variable m is greater than the constant M (OP27: Yes), the notification determination process is completed for all of the primary systems allocated to the frequency band Fk extracted from the primary system table 15, and the process proceeds to OP28. If the variable m is equal to or smaller than the constant M (OP27: No), there is a primary system not yet subjected to the notification determination process among the primary systems allocated to the frequency band Fk extracted from the primary system table 15, and the process returns to OP22. Subsequently, OP 22 to OP27 are executed for the next primary system.

In OP28, the auxiliary information generation unit 14 adds the frequency band Fk to the notification list. The notification list is a list including the frequency bands determined to be able to be reported to the communication apparatus 2 in the notification determination process. Subsequently, the process proceeds to OP16 of FIG. 6A.

In OP29, the auxiliary information generation unit 14 determines whether the variable n is the same value as the constant N. If the variable n is the same value as the constant N (OP29: Yes), the frequency band Fk does not match with any sensing capability information as a result of the notification determination process of the frequency band Fk, and the frequency band Fk is determined to be unable to be reported. Therefore, if the variable n is the same value as the constant N, the frequency band Fk is not included in the notification list and not included in the WS information. Subsequently, the process proceeds to OP16 of FIG. 6A. If the variable n is a value different from the constant N (OP29: No), the process proceeds to OP30.

In OP30, the auxiliary information generation unit 14 adds 1 to the variable n to update the variable n. Subsequently, the process returns to OP23, and the processes of OP23 to OP25 are repeatedly executed for the next sensing capability information.

Through the execution of the processes of the flow charts illustrated in FIGS. 6A and 6B, the management server 1 executes the notification determination process for each frequency band Fk that partially or entirely overlaps with the sensing available frequency band of the communication apparatus 2 included in the sensing capability information. In FIG. 6B, the management server 1 determines the availability of reporting of the frequency band Fk for each piece of sensing capability information received from the communication apparatus 2. If there is a piece of sensing capability information in which the frequency band Fk matches, the frequency band Fk is determined to be able to be reported and is registered in the notification list.

However, the notification destination process of the frequency band is not limited to the process of the flow chart illustrated in FIG. 6B. For example, the auxiliary information generation unit 14 may further extract, based on predetermined rules, a frequency band to be reported to the communication apparatus 2 from among the frequency bands included in the notification list generated by the execution of the process of the flow chart illustrated in FIG. 6B and may include the frequency band in the WS information to transmit the information to the communication apparatus 2. The predetermined rules are, for example, parameters for selecting the frequency band from the notification list. The parameters are parameters indicating the ease of use when the frequency band is secondarily used. Examples of the parameters include an average occupancy rate of each primary system, needed sensing sensitivity, a cycle of switching occupied/unoccupied, and the like.

Furthermore, for example, when the average occupancy rate of the primary system is used as a parameter for selecting the frequency band from the notification list, the primary system information acquisition unit 11 acquires the average occupancy rate of each primary system as a piece of the frequency use information. The acquired average occupancy rate of each primary system is stored in the sensing auxiliary information database 16. The auxiliary information generation unit 14 extracts a predetermined number of frequency bands in ascending order of the primary system average occupancy rate from the frequency bands that can be reported to the communication apparatus 2 included in the notification list and includes the frequency bands in the WS information to transmit the information to the communication apparatus 2. One of the occupancy rate in the time direction in the frequency band, the occupancy rate in the frequency direction, and the occupancy rate of both is used as the average occupancy rate. The communication apparatus 2 of each secondary system can also designate and include, in the sensing capability information, parameters for selecting the frequency, for the management server 1.

When a plurality of pieces of sensing capability information are received in the notification determination process of the frequency band Fk of FIG. 6B, all pieces of sensing capability information are handled equally and are sequentially selected as processing targets based on the variable n. The arrangement is not limited to this, and for example, priorities may be set based on the sensing methods, and the variable n may first indicate the sensing capability information including the information related to the sensing method with a high priority. For example, a high priority is set for the sensing capability information including the information of the sensing method that can detect the wireless signal with higher sensing sensitivity or accuracy. For example, when a higher priority is set for the sensing based on the detection of cyclostationarity compared to other sensing methods, the auxiliary information generation unit 14 first applies the notification determination process to the sensing capability information including the information related to the sensing by the detection of cyclostationarity. As a result, the frequency band that validates the sensing method capable of sensing the wireless signal with higher sensing sensitivity or accuracy is determined to be able to be reported. Furthermore, the sensing auxiliary information includes the information related to the sensing method for the primary system with the valid sensing method capable of sensing the wireless signal with higher sensing sensitivity or accuracy. The communication apparatus 2 can perform sensing according to the generated sensing auxiliary information to perform sensing by the sensing method capable of sensing the wireless signal with higher sensing sensitivity or accuracy.

The management server 1 may store the location information of each primary system in the sensing auxiliary information database 16 and may use the location information of the communication apparatus 2 to extract the primary system that executes the notification determination process of the frequency band Fk. For example, if there are a plurality of primary systems that use the frequency band Fk, the auxiliary information generation unit 14 compares the location information of the communication apparatus 2 and each piece of primary system location information. If the location of the communication apparatus 2 is sufficiently away from the propagation range of the wireless signal of the primary system, there is no interference with the primary system, and the communication apparatus 2 may not perform sensing for the corresponding primary system. Therefore, the auxiliary information generation unit 14 removes the corresponding primary system from the target of the notification determination process of the frequency band Fk and extracts another primary system.

<Communication Apparatus of Secondary System>

Figure 7:
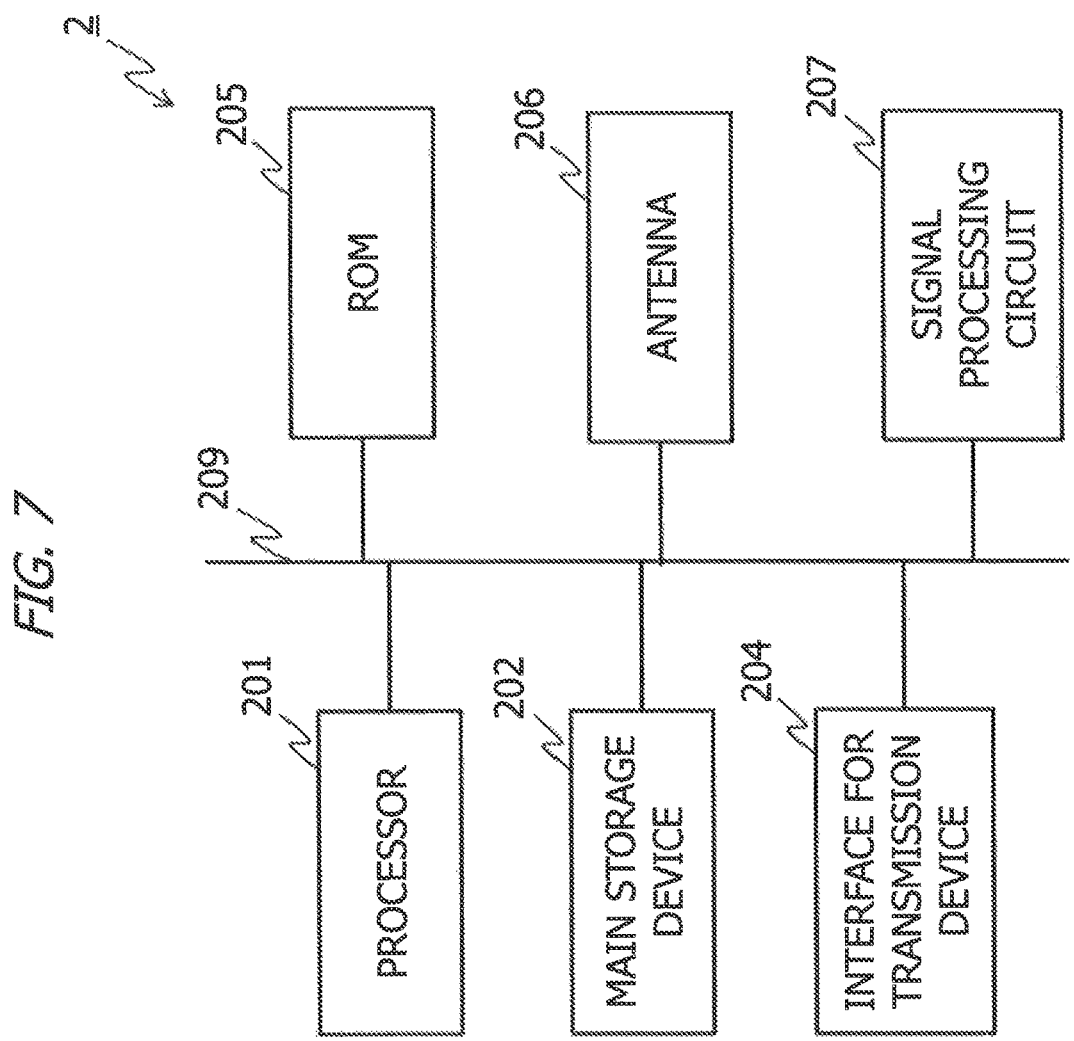
FIG. 7 is a diagram illustrating an example of a hardware configuration of a communication apparatus of a secondary system.

FIG. 7 is a diagram illustrating an example of a hardware configuration of the communication apparatus 2 of the secondary system. The communication apparatus 2 of the secondary system is, for example, an information processing apparatus, such as a wireless base station, a portable information terminal, a portable phone terminal, a smartphone, a car navigation, a general-purpose computer, and a dedicated server computer, or is a sensing device included in these apparatuses. In the communication apparatus 2, the sensing device and the communication device may be separated or may be integrated. FIG. 7 illustrates an example of a configuration of the sensing device when the sensing device and the communication device of the communication apparatus 2 are separated. The communication apparatus 2 includes a processor 201, a main storage device 202, an interface for transmission device 204, a ROM 205, an antenna 206, and a signal processing circuit 207. In the communication apparatus 2, these are connected to each other by a bus 209.

The signal processing circuit 207 processes a wireless signal received by the antenna 206. The signal processing circuit 207 includes, for example, circuits, such as a filter and an amplifier. The signal processed by the signal processing circuit 207 is transmitted to the processor 201. The antenna 206 may be included specific to the sensing device of the communication apparatus 2 or may be shared by the communication device. When the communication between the management server 1 and the communication apparatus 2 is performed through the antenna 206 included in the sensing device, the signal is input to the signal processing circuit 207 according to an instruction of the processor 201, processed by the signal processing circuit 207, and output from the antenna 206. The communication between the management server 1 and the communication apparatus 2 is performed through the antenna 206 included in the sensing device when, for example, the antenna 206 is shared by the communication device, and the communication apparatus 2 communicates with the management server 1 through a wireless network. The antenna 206 is an example of a "transmission unit" or a "reception unit" of a "wireless communication apparatus" when the communication between the management server 1 and the communication apparatus 2 is performed through the antenna 206 included in the sensing device.

The interface for transmission device 204 is an interface with a transmission device in the communication apparatus 2. The interface for transmission device 204 is an example of a "transmission unit" or a "reception unit" of a "wireless communication apparatus" when the communication between the management server 1 and the communication apparatus 2 is performed through a network interface included in the communication device separate from the sensing device. The communication between the management server 1 and the communication apparatus 2 is performed through the network interface included in the communication device when, for example, the management server 1 and the communication apparatus 2 communicate through a wired network, or when the communication device and the sensing device of the communication apparatus 2 separately include antennas, and the communication device communicates with the management server 1.

The ROM 205 stores, for example, a sensing program for sensing. The main storage device 202 provides the processor 201 with a storage area and a working area for loading a program or is used as a buffer. The main storage device 202 is, for example, a semiconductor memory such as a RAM.

The processor 201 is, for example, a network processor, a CPU, or the like. The processor 201 executes the sensing program loaded on the main storage device 202 to execute, for example, a sensing process.

Figure 8:
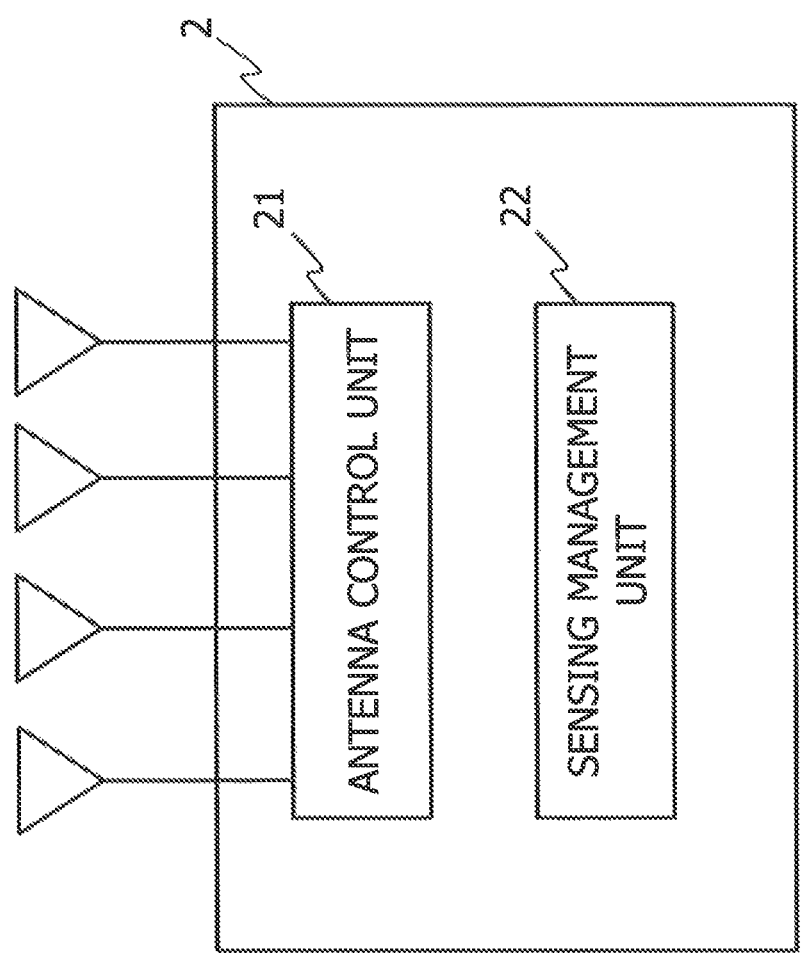
FIG. 8 is a diagram illustrating an example of functional blocks of the communication apparatus.

FIG. 8 is a diagram illustrating an example of functional blocks of the communication apparatus 2. The processor 201 of the communication apparatus 2 executes the sensing program loaded on the main storage device 202. Through the execution of the sensing program, the communication apparatus 2 operates as an antenna control unit 21 and a sensing management unit 22.

The sensing management unit 22 transmits the sensing capability information of the communication apparatus 2 to the management server 1 when, for example, the communication device of the communication apparatus 2 issues a connection request. The sensing management unit 22 also receives the WS information and the sensing auxiliary information from the management server 1 to execute the sensing process according to the sensing auxiliary information. In the sensing process, the sensing management unit 22 issues an instruction regarding antenna control to the antenna control unit 21. The sensing management unit 22 is an example of a "processing unit" of a "wireless communication apparatus".

The antenna control unit 21 controls the antenna 206 according to an instruction from the sensing management unit 22. For example, when the directional sensing is executed, the sensing management unit 22 transmits, to the antenna control unit 21, information related to the setting of the antenna included in the sensing auxiliary information received from the management server 1. The antenna control unit 21 sets the adjustment of the direction of the antenna 206, the angle of elevation, and the reception frequency band according to the information related to the setting of the antenna received from the sensing management unit 22.

When the WS information and the sensing auxiliary information are received from the management server 1, the sensing management unit 22 executes, for example, the following process.

For example, the sensing management unit 22 selects a sensing method to be executed according to the needed sensing sensitivity, which is notified by the sensing auxiliary information, of the primary system that primarily uses the frequency band to be subjected to sensing. For example, the sensing auxiliary information notifies that the communication apparatus 2 can perform the sensing by the energy detection and the sensing by the cyclostationary detection and that the cyclostationary detection is valid in the primary system of the frequency band to be subjected to the sensing process. If the needed sensing sensitivity of the primary system of the frequency band to be subjected to the sensing process is loose (value is large), the sensing management unit 22 performs the sensing by the energy detection. If the needed sensing sensitivity of the primary system of the frequency band to be subjected to the sensing process is harsh (value is small), the sensing management unit 22 performs the sensing by the cyclostationary detection. In this way, since the process is simpler and the power consumption is smaller in the sensing by the energy detection than in the sensing by the cyclostationary detection, an improvement in terms of power consumption is possible.

Furthermore, for example, the sensing management unit 22 selects the frequency band to be subjected to the sensing process from the frequency band included in the WS information and selects the sensing method, according to the sensing auxiliary information received from the management server 1 and the sensing capability of the sensing management unit 22. For example, for all frequency bands included in the WS information, the sensing management unit 22 calculates estimation of the power consumption when the sensing and the communication are performed and selects the frequency band and the sensing method with the smallest power consumption. Other than the power consumption, for example, time length for secondary use, expected throughput, and the like also serve as selection standards of the frequency band. The time length for the secondary use of the frequency band may be included in the sensing auxiliary information. Furthermore, for example, the sensing management unit 22 may select a frequency band with a high use frequency from a past use history.

The process by the communication apparatus 2 selecting the frequency band to be sensed and the sensing method from the WS information and the sensing auxiliary information received from the management server 1 is not limited to the process described above. For example, when the reliability of details of the sensing auxiliary information from the management server 1 is high (for example, information compliant with standards or the like) with respect to a predetermined frequency band, the sensing may be performed as in the information included in the sensing auxiliary information.

Specific Example

The first embodiment will be described with a more specific example. Three primary systems, primary systems 1001, 2001, and 3001, exist in the present specific example. First, the frequency use information of each primary system is as follows. The numeric values of the frequency band and the like in each primary system are set for the convenience of the description and are not based on a system actually operated.

(Primary System 1001)
TV broadcast system
Used frequency band: 470 MHz to 710 MHz
Increments of used bandwidth: every 6 MHz from 470 MHz
Modulation mode: OFDM
Cyclostationary detection: valid
: Information related to cyclostationarity (details of stationarity: autocorrelation in time direction is 1, related parameter: autocorrelation is 1 for 100 μm with a delay of 900 μs)
Sensing with directionality: valid
Needed sensing sensitivity (per 1 MHz): +50 dBμV/m
(Primary System 2001)
Private wireless system
Used frequency band: 920 MHz to 950 MHz
Increments of used bandwidth: every 10 MHz from 920 MHz
Modulation mode: OFDM
Cyclostationary detection: valid
: Information related to cyclostationarity (details of stationarity: autocorrelation in time direction is 1, related parameter: autocorrelation is 1 for 300 μm with a delay of 2000 μs)
Sensing with directionality: invalid
Needed sensing sensitivity (per 1 MHz): +60 dBμV/m
(Primary System 3001)
Radar private wireless system
Used frequency band: 960 MHz to 1.2 GHz
Increments of used bandwidth: every 40 MHz from 960 MHz
Modulation mode: FM modulation
Cyclostationary detection: invalid
Sensing with directionality: valid
Needed sensing sensitivity (per 1 MHz): +35 dBμV/m In addition to the frequency use information of the primary systems, 710 MHz to 920 MHz and 950 MHz to 960 MHz are secondary use unavailable bands in the present specific example. The primary system information acquisition unit 11 of the management server 1 acquires the frequency use information of each primary system and the secondary use unavailable bands from the database of the primary system.

FIG. 9 is the primary system table 15 of the management server 1 according to the present specific example. FIG. 10 is the sensing auxiliary information database 16 of the management server 1 according to the present specific example. FIG. 10 illustrates the sensing auxiliary information database 16 created along the example of the sensing auxiliary information database 16 illustrated in FIG. 4B. However, the management server 1 stores the frequency use information of the primary systems in addition to the information illustrated in FIG. 10.

The sensing capability of the communication apparatus 2 of the secondary system in the present specific example is as follows.
(Communication Apparatus of Secondary System)
Sensing available frequency: 600 MHz to 1 GHz
Sensing sensitivity of energy detection when directional sensing is invalid (per 1 MHz): +60 dBμV/m
Sensing sensitivity of energy detection when directional sensing is valid (per 1 MHz): +52 dBμV/m
Sensing sensitivity of cyclostationary detection when directional sensing is invalid (per 1 MHz): +40 dBμV/m
Sensing sensitivity of cyclostationary detection when directional sensing is valid (per 1 MHz): +34 dBμV/m
The communication apparatus 2 of the secondary system transmits the sensing capability information to the management server 1, and the management server 1 receives the sensing capability information from the communication apparatus 2.

FIG. 11 illustrates the sensing capability information received by the management server 1 in the present specific example. The management server 1 executes the processes of the flow charts of FIGS. 6A and 6B to generate the WS information and the sensing auxiliary information and transmits the information to the communication apparatus 2.

Since the frequency bands of all entries of the primary system table 15 in the present specific example partially or entirely overlap with the sensing available frequencies of the communication apparatus 2, the frequency bands are extracted as the frequency bands Fk in the processes of the flow charts of FIGS. 6A and 6B. Hereinafter, a frequency band F1=470 MHz to 710 MHz, a frequency band F2=920 MHz to 950 MHz, and a frequency band F3=960 MHz to 1.2 G (see FIG. 9) are set. The process of the flow chart of FIG. 6B is executed for the frequency bands F1 to F3.

The frequency band F1 is primarily used by the primary system 1001. The sensing capability information of n=4 (FIG. 11) corresponds to the primary system 1001, and the frequency band F1 is added to the notification list as a frequency band that can be reported to the communication apparatus 2.

The frequency band F2 is primarily used by the primary system 2001. The sensing capability information of n=2 (FIG. 11) corresponds to the primary system 2001, and the frequency band F2 is added to the notification list as a frequency band that can be reported to the communication apparatus 2.

The frequency band F3 is primarily used by the primary system 3001. None of the sensing capability information of n=1 to n=5 corresponds to the primary system 3001, and the frequency band F3 is not added to the notification available list as a frequency band that can be reported to the communication apparatus 2.

Thus, the WS information and the sensing auxiliary information transmitted from the management server 1 to the communication apparatus 2 of the secondary system in the present specific example are as follows.

(WS Information)
  Secondarily usable frequency band 1: 602 MHz to 710 MHz
  Secondarily usable frequency band 2: 920 MHz to 950 MHz (Sensing Auxiliary Information)
  Secondarily usable frequency band 1
    Every 6 MHz from 602 MHz
    Needed sensing sensitivity: +50 dBμV/m
    Information related to cyclostationarity
      Details of stationarity: autocorrelation in time direction is 1
      Related parameter: autocorrelation is 1 for 100 μs with a delay of 900 μs
    Information related to directional sensing
      Direction of arrival: 240° from true north, angle spread 10°
      Angle of elevation: +30° from horizontal, angle spread 5°
  Secondarily usable frequency band 2
    Every 10 MHz from 920 MHz
    Needed sensing sensitivity: +60 dBμV/m
    Information related to cyclostationarity
      Details of stationarity: autocorrelation in time direction is 1
      Related parameter: autocorrelation is 1 for 300 μs with a delay of 2000 μs
    Information related to directional sensing: invalid The secondarily usable frequency band 1 of the sensing auxiliary information includes information related to the sensing method for the primary system 1001. The secondarily usable frequency band 2 of the sensing auxiliary information includes information related to the sensing method for the primary system 2001. The secondarily usable frequency band 1 included in the WS information includes a part of the frequency band F1 (470 MHz to 710 MHz) overlapping with the sensing available frequency band (600 MHz to 1 GHz) of the communication apparatus 2. The reason that the secondarily usable frequency band 1 starts at 602 MHz is that the frequency is used every 6 MHz in the primary system 1001.

The auxiliary information generation unit 14 of the management server 1 calculates the information related to the directional sensing of the sensing auxiliary information, from the location information of the primary system 1001, the information of the transmission antenna pattern, and the like, and from the location information of the communication apparatus 2.

Operation and Effects of First Embodiment

In the first embodiment, the communication apparatus 2 of the secondary system notifies the management server 1 of the sensing capability information of the communication apparatus 2. The management server 1 selects the secondarily usable frequency band according to the notified sensing capability information and feeds back, to the communication apparatus 2, the secondarily usable frequency band and the sensing auxiliary information related to the sensing method in the frequency band.

For example, since the sensing auxiliary information includes parameters, such as delay time and length of section where autocorrelation is 1, as information related to the cyclostationarity, the communication apparatus 2 may not detect these parameters, and the sensing time can be reduced. This can reduce the power consumption, compared to when the communication apparatus 2 of the secondary system detects the parameters.

As the sensing auxiliary information is reported to the communication apparatus 2 of the secondary system, the frequency bands to be sensed and the sensing methods are narrowed down. Therefore, the power consumption for the process of narrowing down the frequency bands to be sensed and the sensing methods is reduced.

Furthermore, when the sensing by the energy detection and the sensing by the cyclostationary detection are compared, the reception power of the reception signal includes noise power in the sensing by the energy detection, and the determination accuracy is degraded if the reception power of the signal from the primary system is smaller than the noise power. On the other hand, in the sensing by the cyclostationary detection, the autocorrelation of the signal with cyclostationarity is 1, and the autocorrelation of noise is 0. The sensing of the signal from the primary system can be more easily determined compared to the sensing by the energy detection. Therefore, with the notification of the validity of the sensing by the cyclostationary detection in the frequency band notified by the WS information, the communication apparatus 2 performs the sensing by the cyclostationary detection, and the accuracy of sensing can be further improved.

Since the directionality (direction with largest antenna gain) is directed to the direction of arrival of the signal from the primary system when the communication apparatus 2 performs the directional sensing, high reception power can be obtained by the antenna gain, and the sensing sensitivity is improved. On the other hand, when the directional sensing is not performed or when the direction of directivity is wrong, the reception power is reduced. Therefore, as the sensing auxiliary information includes the direction of arrival of signal, the angle of elevation, and the like as information related to the directional sensing, the communication apparatus 2 can set the antenna to obtain higher reception power, and the sensing sensitivity is improved.

When the primary system intermittently transmits signals, it is desirable that the communication apparatus 2 quickly detects the start of the transmission by the primary system to avoid interference in the secondary use and reduces the sensing time to stop the signal transmission. In this case, if transmission patterns of the primary system are included in the sensing auxiliary information, the communication apparatus 2 can start and stop the communication according to the transmission pattern of the primary system. For example, when the primary system performs transmission or does not perform transmission on a second-to-second basis, the communication apparatus 2 of the secondary system determines whether there is transmission by the primary system at the top of the section of one second. In this case, if there is no transmission by the primary system, the communication apparatus 2 performs communication within the remaining time of the section of one second. Since the information related to the sensing method for the primary system is notified by the sensing auxiliary information, the time (sensing time) taken for the determination of whether there is transmission by the primary system can be reduced, and the time that allows the communication apparatus 2 to communicate can be increased.

In this way, the sensing auxiliary information can be transmitted to the communication apparatus 2 of the secondary system to improve the sensing accuracy or sensitivity of the communication apparatus 2 of the secondary system or to reduce the sensing time, without changing the hardware.

According to the disclosed information processing apparatus and information processing method, the processing efficiency of sensing the wireless signal of the wireless communication apparatus can be improved. For example, the sensitivity or the accuracy of sensing the wireless signal of the wireless communication apparatus can be improved. Furthermore, for example, the time taken for sensing the wireless signal can be reduced.

All examples and conditional language provided herein are intended for the pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiment(s) of the present invention have been described in detail, it should be understood that the various changes, substitutions, and alterations could be made hereto without departing from the spirit and scope of the invention.

What is claimed is:

1. An information processing apparatus that manages information of a first frequency band allocated to a first communication system, the information processing apparatus comprising:
    a reception unit that receives, from a second communication system different from the first communication system, first information indicating one or more executable sensing methods by a communication apparatus of the second communication system; and
    a transmission unit that transmits, to the communication apparatus of the second communication system, second information used to select a sensing method, from the one or more executable sensing methods, for sensing a wireless signal transmitted from a communication apparatus of the first communication system and transmitted by using a second frequency band included in the first frequency band, the second information including at least validity of cyclostationary detection of the wireless signal transmitted from the communication apparatus of the first communication system and transmitted by using the second frequency band, and validity of directional sensing of the wireless signal transmitted from the communication apparatus of the first communication system and transmitted by using the second frequency band.

2. A wireless communication apparatus of a second communication system different from a first communication system provided with a first frequency band, the wireless communication apparatus comprising:
    a transmission unit that transmits first information indicating one or more executable sensing methods sensing a wireless signal transmitted from another wireless communication apparatus, to an information processing apparatus that manages information of the first frequency band;
    a reception unit that receives second information used to select a sensing method, from the one or more executable sensing methods, for sensing a wireless signal transmitted from a communication apparatus of the first communication system and transmitted by using a second frequency band included in the first frequency band, the second information including at least validity of cyclostationary detection of the wireless signal transmitted from the communication apparatus of the first communication system and transmitted by using the second frequency band, and validity of directional sensing of the wireless signal transmitted from the communication apparatus of the first communication system and transmitted by using the second frequency band; and
    a processing unit that selects a sensing method based on the second information transmitted from the information processing apparatus and senses a wireless signal transmitted by using the second frequency band from the first communication system by the selected sensing method.

3. An information processing method by an information processing apparatus that manages information of a first frequency band allocated to a first communication system, the information processing method comprising:
    receiving, from a second communication system different from the first communication system, first information indicating one or more executable sensing methods by a communication apparatus of the second communication system; and
    transmitting, to the communication apparatus of the second communication system, second information used to select a sensing method, from the one or more executable sensing methods, for sensing a wireless signal transmitted from a communication apparatus of the first communication system and transmitted by using a second frequency band included in the first frequency band, the second information including at least validity of cyclostationary detection of the wireless signal transmitted from the communication apparatus of the first communication system and transmitted by using the second frequency band and validity of directional sensing of the wireless signal transmitted from the communication apparatus of the first communication system and transmitted by using the second frequency band.

* * * * *